Norman C. Williams
Harry F. Everett
INVENTORS

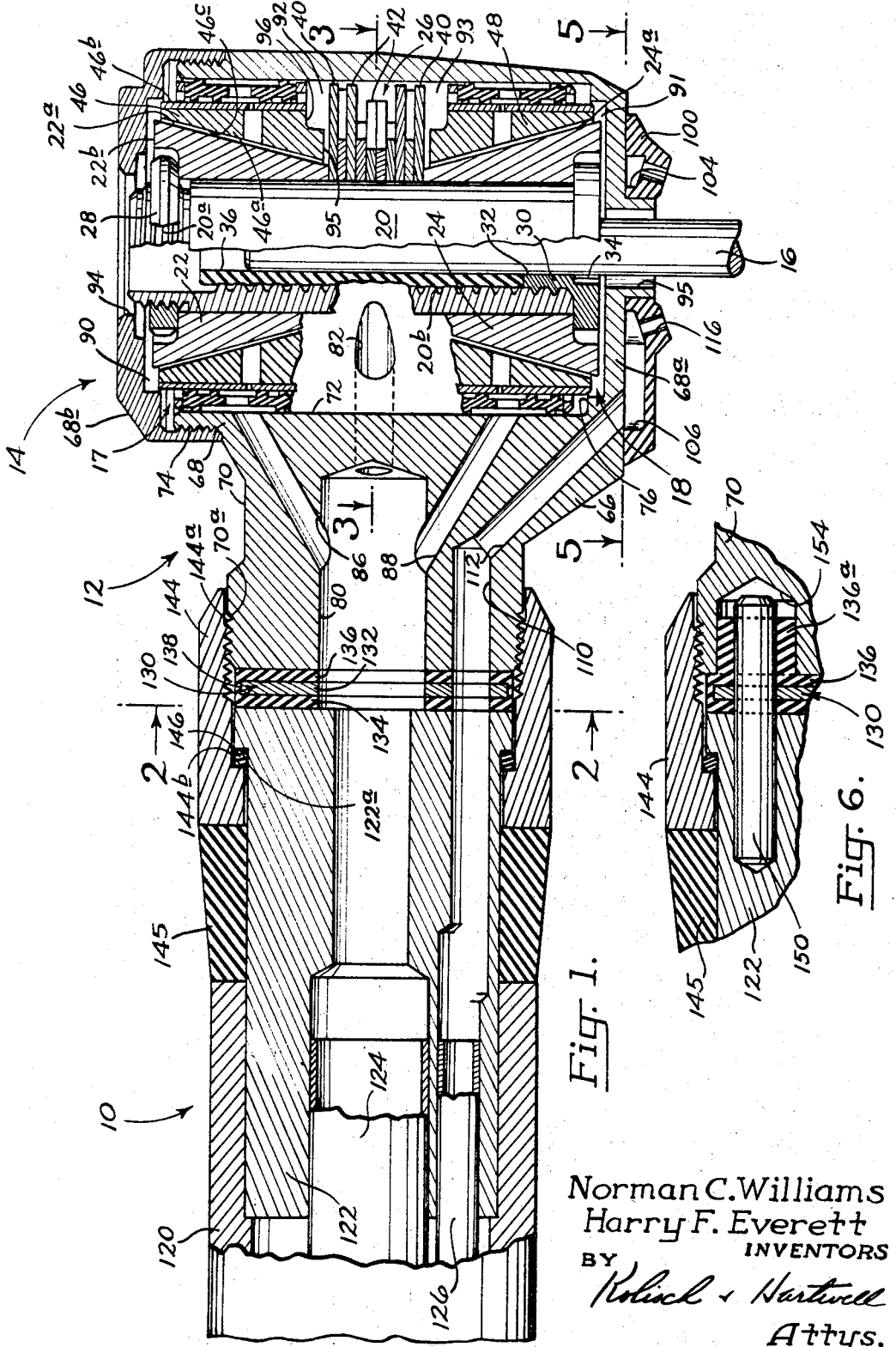

United States Patent Office 3,408,043
Patented Oct. 29, 1968

3,408,043
PNEUMATIC MOTOR
Norman C. Williams, Portland, and Harry F. Everett, Lake Oswego, Oreg., assignors to Power Brake Equipment Company, Portland, Oreg., a corporation of Oregon
Filed Apr. 3, 1967, Ser. No. 627,894
10 Claims. (Cl. 253—2)

ABSTRACT OF THE DISCLOSURE

A dental handpiece including an air-powered turbine wheel for rotating a burr-carrying spindle, with opposed self-adjusting air bearing assemblies supporting the spindle in a casing for the handpiece, the air bearing assemblies including elastomeric rings slidably supporting stator bearings in the air bearing assemblies in a smooth-walled tunnel in the casing, with the spindle, turbine wheel, and air bearing assemblies being removably from such tunnel as a unit assembly.

---

This invention relates to motors generally, and more particularly to improvements in gas bearing assemblies provided in a motor for supporting rotatable motor parts.

Hydrostatic gas bearings have proven useful as the antifriction means supporting the rotor in a dental handpiece, since they have extremely low friction characteristics and permit relatively high speeds to be obtained in the rotor. Such gas bearings have other advantages, of course, including permitting operation with minimum vibration and noise, ease of maintenance, etc., which make them well suited for the precise operation of a dental handpiece. As a consequence the invention is described in connection with a dental handpiece, although it should be understood that this is for the purpose of illustration, and not intended by way of limitation unless so stated.

One general feature and object of the invention is to provide an improved pneumatic motor with a gas bearing assembly supporting the rotor thereof, where the gas bearing assembly is self-adjusting to produce automatically the proper clearance desired in the bearing assembly.

More specifically, an object is to provide a construction wherein the gas bearing assembly comprises relatively rotatable journal and bearing parts having cooperating frusto-conical, gas-bearing defining surfaces that define a capillary space of tapered outline, so that gas under pressure in such space as a consequence tends to urge the parts axially apart, and which further includes a slide mounting for one of the parts accommodating axial movement, and a system for introducing gas under pressure against an end of said one part for resisting such sliding movement of the one part. With the organization contemplated, the movable part is urged close enough to the other part to maintain proper clearance between the gas-bearing defining surfaces of the parts.

Another object of the invention is to provide, in a pneumatic motor including a gas bearing assembly for supporting the rotor thereof, an improved form of mounting for a stator bearing in such bearing assembly, which accommodates axial sliding movement of the stator bearing with the mounting also providing for the admission of air from a source into passage means provided in the bearing, which air is thence supplied to a capillary space located between the stator bearing and rotatable journal that is part of the rotor.

In a dental handpiece and like machinery utilizing gas bearing assemblies, the operating parts have quite small size and must be manufactured to close tolerances. Assembly of the parts should be done under closely supervised conditions, in the absence of dirt and by skilled technicians, to assure proper placement, etc. Best results are obtained when repair is required if the bearing assemblies, spindle, turbine wheel and associated parts may be removed from the handpiece as a unit and returned to a supervised repair site for servicing. Accordingly, another object of the invention is the provision of pneumatic motor construction which accommodates the removal and reinsertion of bearing assemblies, spindle and turbine wheel as a unit assembly.

Yet another object is the provision of a pneumatic motor constructed to enable the removal of motor parts as a unit assembly, where such unit assembly includes outer stator bearings in gas bearing assemblies, and these stator bearings are slidable components in the gas bearing assemblies providing for self-adjustment in the gas bearing assemblies.

Another object is to provide a novel carrier ring assembly forming part of a slidable stator bearing in a gas bearing assembly of the type described.

A further object of the invention is the provision, in a dental handpiece, of novel means for discharging into the atmosphere fluid under pressure, such as water and air, at locations adjacent where the burr or cutter is mounted in the handpiece. Such fluids are useful in cooling, cleaning, and drying the area being worked upon.

A still further feature of the invention is the provision of novel means for mounting the casing of a powerhead assembly in a dental handpiece on a handle, whereby vibrations which might be produced in the powerhead assembly are absorbed and not transmitted to the handle. Further, the mounting by absorbing or damping such vibrations minimizes any resonating tendencies and thus contributes to smooth, noiseless operation.

These and other objects and advantages are obtained by the invention, which is described hereinbelow in connection with the accompanying drawings, wherein:

FIG. 1 illustrates, in cross section, portions of a dental handpiece including a pneumatic motor, as contemplated in a preferred embodiment of the invention;

Figure 5:
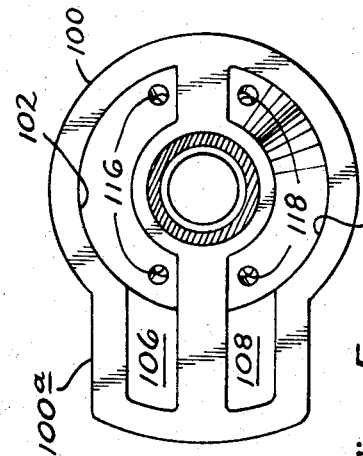

FIG. 5, taken along the line 5—5 in FIG. 1, shows a manifold provided in the powerhead assembly; and FIG. 6 (first page of drawings) is a cross-sectional view along the line 6—6 in FIG. 1.

Referring now to the drawings, the dental handpiece illustrated comprises a handle portion 10 and a powerhead assembly 12 which is supported on the end of the handle portion. At the end of the powerhead assembly is a pneumatic motor 14 which operates, when energized, to rotate at high speed a dental burr or cutter, the shank of which is partially shown at 16.

Considering now particulars of the construction of the pneumatic motor, it includes an elongated hollow spindle 20, a pair of gas-bearing assemblies 17, 18 adjacent opposite ends of the spindle, and a turbine wheel 26 mounted on the spindle between the gas bearing assemblies.

Gas bearing assemblies 17, 18 include journals 22, 24, respectively, which with the turbine wheel and spindle form the rotor in the pneumatic motor. Journals 22, 24 and the turbine wheel are clamped securely on the spindle by turning a spindle nut 28 screwed onto an externally threaded portion 20a of the spindle downwardly on the spindle, whereby the journals and turbine wheel are forced downwardly in FIG. 1 against a spindle retainer 30 screwed into an internally threaded portion 20b of the spindle. The retainer includes an internal bore 32 accommodating shank 16 of the dental burr. Recessed inwardly from the wall of bore 32, at circumferentially distributed points, are key slots such as the one shown at 34, into which an instrument may be fitted to hold the spindle retainer while tightening nut 28.

The burr shank is held within the spindle through frictional engagement with the inner wall of a tubular chuck 36 made of an elastomeric material. The chuck itself may be placed within the spindle by moving it downwardly into the spindle's internally threaded region, and while holding onto the spindle through key slots 34 described.

The rotor journals take the form of conical frustrums, and have frusto-conical circumferential surfaces 22a, 24a bounding their exteriors. As will hereinafter become more fully apparent, these surfaces constitute gas-bearing defining surfaces in the air bearing assemblies.

Turbine wheel 26 comprises opposed shrouds 40 of circular outline, and multiple turbine blades 42 in the form of discs lying in planes paralleling the planes of the shrouds stacked one against the other in the space between the shrouds. The shrouds where they extend outwardly from the spindle are imperforate. Each turbine blade is recessed at regular intervals about its periphery (see FIG. 3) whereby radially outwardly projecting legs, such as those shown at 44, are defined distributed about the axis of the blade. Adjacent turbine blades are angularly offset about the axis of the spindle. With such a construction, a highly effective drag turbine wheel is produced.

Forming part of the gar bearing assemblies and encircling the rotor journals are stator bearings shown at 46, 48. The stator bearings are similar in construction and only one will be described in detail. Thus, and referring to bearing 46, such comprises a bearing liner 46a surrounded by and joined to an annular bearing shell 46b. Liner 46a is bounded around the inside thereof by a frusto-conical surface 46c which constitutes another gas-bearing defining surface. Surface 46c and the frusto-conical surface of associated rotor journal 22 define an annular capillary space of tapered outline extending between the rotor journal and stator bearing for containing gas under pressure distributed as a supporting film.

Figure 4:
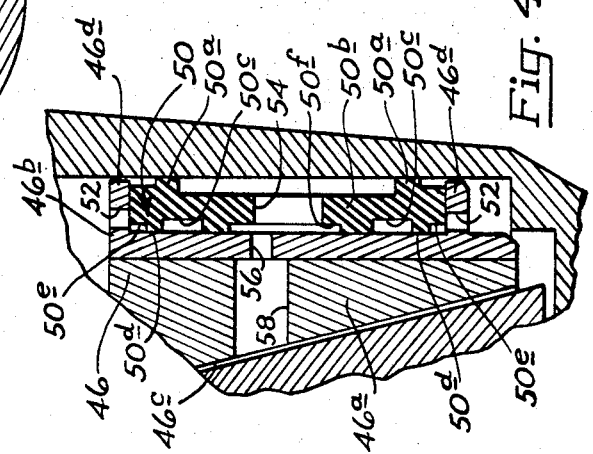
FIG. 4 is a view, on a somewhat enlarged scale, illustrating portions of a carrier ring assembly provided in the pneumatic motor.

Further describing a stator bearing, and referring now also to FIG. 4, lodged within a channel defined between bearing shell ridges 46d presented on the outside of bearing shell 46b is a ring assembly 50. The ring assembly shown is an integral member of elastomer material. Annular ridges 50a about the outside of the assembly form with central web 50b a channel which functions as a manifold space for air. Web 50b is recessed with annular grooves 50c on the inside of the assembly adjacent ridges 50a, with ridges 50d being defined which provide a tight seal with the outside of liner 46b. With air under pressure in the manifold space, and with a lower pressure existing outwardly of ridges 50d, the grooves provide flexibility in the web enabling a tendency to deflect whereby ridges 50d are pressed into tighter engagement with the bearing shell. Bearing shell 46b is provided with a series of passages 52 extending through its side flanges 46d, which passages connect with shallow annular grooves 50e provided in the ring assembly adjacent each end. In this way any pressure condition directly adjacent the ends of the bearing shell is reflected in grooves 50e. As will be explained, with operation of the motor, such is a low pressure condition and this promotes the tight sealing of ridges 50c against the outside of the bearing shell.

A capillary space of tapered outline has been described for each gas bearing assembly, which contains gas (air) under pressure distributed as a supporting film with the pneumatic motor operating. Gas contained within the manifold space on the outside of the ring assembly is supplied to the annular capillary space through bores such as the one shown in 54 which are equally circumferentially distributed about the web of the ring assembly. These bores communicate with a groove 50f on the inside of web 50b. At equally circumferentially spaced points about the bearing assembly, choke passages of relatively small diameter, such as those shown at 56 extend radially through the bearing shell. Communicating with each choke passage is an expansion passage 58. These choke and expansion passages connect the capillary space with groove 50f.

As is understood by those skilled in the art, best results with a gas bearing are obtained where the capillary space has the smallest possible thickness. With a very thin capillary space, upon any displacement of the rotor journal from a concentric position, pressure sharply increases on the side of the journal toward which the journal moves, and a sharp decrease in pressure occurs on the opposite side. These pressure changes then immediately function to tend to recenter the rotor journal. Very small choke passages are provided, in order to inhibit rapid inflow of air where there is a pressure drop. The choke hole size is related to the clearance of the bearing surfaces in the assembly, to produce what is known in the art as a "condition of choke," meaning that on displacement of the rotor there is rapid and significant pressure change without significant compensating air flow coming through the choke passages. Because of practical manufacturing tolerance limitations, a clearance between the bearing surfaces of 0.0002 to 0.0003 of an inch might be employed, and the choke passages are then proportioned to provide the desired condition of choke with such clearance.

In putting together the pneumatic motor, the two air bearing assemblies are assembled on the spindle with the turbine wheel separating the stator bearings, prior to the spindle nut being tightened on the threaded upper end portion of the spindle. Each stator bearing is then prevented from moving axially off the end of the spindle, by reason of the taper in the outer surface of its associated journal. The turbine wheel extends radially outwardly beyond inner extremities of the stator bearings, and limits movement of the stator bearings axially in the opposite direction.

Powerhead asesmbly 12 includes a casing 66 comprising a housing section 68 for the pneumatic motor and a cylindrical boss 70 joined to section 68. Housing section 68 has an elongated, smooth-walled bore or tunnel 72 extending through a substantial portion of its length. As seen in FIG. 1, the bottom end of the housing section is closed off by an end wall or cover portion 68a which is an integral part of that part of the housing section. The opposite end of the housing section is closed off by a detachable cap or cover portion 68b. Cap 68b is internally threaded and screwed onto external threads 74. Bore 72, being of uniform diameter extending downwardly into the casing from its openable upper end, provides what is referred to herein as a slide mounting for the stator bearings in the two air bearing assemblies, and accommodates sliding movement of the stator bearings axially toward each other as urged by gas under pressure in the capillary spaces defined in the air bearing assemblies. The tunnel or bore being uniformly cross-sectioned in an axial direction extending downwardly from its openable upper end to ledge 76, it has the requisite size to enable removal of the spindle, turbine wheel and air bearing assemblies as a unit assembly.

Figure 3:
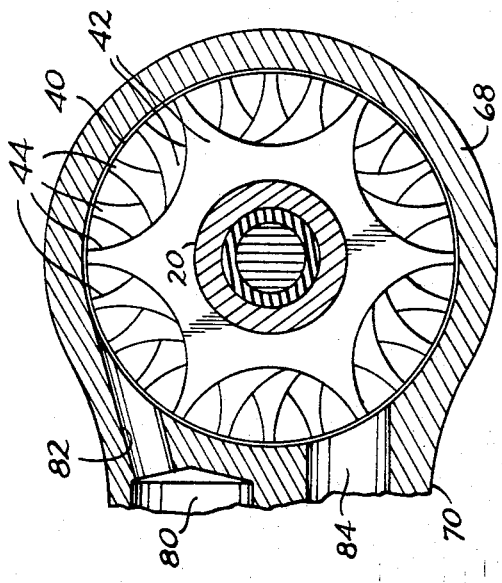
FIG. 3 is a cross-sectional view, taken generally on the line 3—3 in FIG. 1, illustrating how air under pressure is channeled in the handpiece to impinge upon a turbine wheel.

Air under pressure to drive the pneumatic motor is supplied from a supply passage or bore 80 extending in an axial direction along boss 70 (refer to FIGS. 1 and 3). Air in passage 80 is directed by bore or course 82 against a side of the turbine wheel, in a region substantially midway between the end shrouds. Air, after driving the turbine wheel, is exhausted through passage 84 which parallels bore 80 (shown in FIG. 3 but not seen in FIG. 1 due to the removal of portions of boss 70 in FIG. 1).

Air is supplied to the air bearing assemblies through passages or courses 86, 88 having one set of ends communicating with supply passage 80 and an opposite set of ends communicating with the manifold spaces extending about the ring assemblies. After being introduced to the capillary spaces, air flows toward the ends of the air bearing assemblies to collect in spaces or chambers 90, 91 and 92, 93. Spaces 90, 91 connect with the atmosphere through openings 94, 95 in the housing cover portions, so these spaces contain air at close to atmospheric pressure. Spaces 92, 93 connect with the atmosphere about the outside of the turbine wheel and through exhaust passage 84.

The stator bearings are bounded over their inner ends by faces such as faces 95, 96 shown for stator bearing 46 in FIG. 1, and these faces bound spaces 92, 93 previously described. The faces move ahead of a stator bearing on the bearing moving axially inwardly as urged by the pressure of air in the capillary space which the bearing surrounds. With air under pressure directed against the turbine wheel through passage 82, and with rotation of the turbine wheel and spindle, windage from the turbine wheel produces a pressure of air in spaces 92, 93 which is somewhat above atmospheric. This air under pressure acting upon the faces presented at the end of a stator bearing tends to urge the stator bearing axially outwardly on the spindle. Thus, with air at 40 p.s.i.g. in passage 80 used to power the turbine wheel, it is estimated that a pressure of some 8 p.s.i.g. exists in spaces 90, 92, operating to force the stator bearings outwardly. The pressure of air in a capillary space adjacent a choke hole is estimated to be about 45% of the pressure of air in passage 80, and this pressure of air in a capillary space, and by reason of the space being tapered, exerts a thrust on a stator bearing forcing it axially inwardly on the spindle. The slide mounting for the stator bearings provided by bore 72 offers substantially no resistance to bearing movement axially. As a consequence, an equilibrium condition is set up wherein the stator bearings are maintained close enough to the rotor journals to maintain proper clearance and a condition of choke. Thus tthe gas bearing assemblies are self-adjusting.

When the handpiece is used in drilling a tooth, on a burr mounted on the spindle meeting resistance, a reaction force results thrusting the spindle and associated parts upwardly in the housing section against cap 68b. Air escaping from air bearing assembly 17 collects in space 90 under cap 68b in FIG. 1, and forms a supporting film between end surface 22b of journal 22 and the inner surface of cap 68b. In this way a dynamic thrust bearing for the end of the rotor in the motor is produced.

Using the dental handpiece described, it is often desirable to be able to eject water, air, or other fluid medium directly into the region being drilled from locations spaced about the axis of the burr. With the construction contemplated, a manifold may be attached to the integral end wall 68a in the housing section, for collecting such fluids and discharging them as jet streams toward the region being drilled. With the end wall being an integral part of the housing section 68, the manifold need not be disturbed in any way on removal of the unit assembly comprising the spindle, turbine wheel and gas bearing assemblies.

More specifically, and referring now to FIGS. 1 and 5, suitably secured to the bottom of end wall 68a is a spray manifold 100 which may be a molded part. Such is formed with a pair of internal, arcuate channels, best shown in FIG. 5 at 102 and 104. The manifold, which has a keyhole shape when viewed in plan as in FIG. 5, further includes, in its stem portion 100a, a pair of feed channels 106, 108. Channel 106 connects with arcuate channel 102, and channel 108 with arcuate channel 104. Referring to FIG. 1, boss 70 of the casing has a passage 110, extending adjacent the base thereof which connects through feed passage 112 with channels 106, 102. A similar passage paralleling passage 110 (not shown in FIG. 1 as removed from the drawing) connects through a passage similar to passage 112 with channels 108, 104. Connecting channel 102 with the atmosphere are discharge ports or passages 116, enabling any fluid such as air supplied to the channel to be ejected as two streams downwardly toward opposite sides of the burr. Similar ports 118 connecting with channel 104 permit the discharge of a fluid such as water as streams toward opposite sides of the burr from channel 104.

Handle portion 10 comprises a handle shell 120 and a handle mount insert 122 secured as by solder to its interior. Suitable conduits are provided within the handle forming continuations of the various passages described in the boss of the powerhead assembly. Those conduits which are shown in FIG. 1 comprise conduit 124 for supplying air to air supply passage 80, and conduit 126 for supplying fluid to passage 110.

With externally pressurized gas bearing assemblies, or hydrostatic gas bearing assemblies, where air or other gas is forced under pressure to a capillary space defined between a journal and a bearing, there is a tendency for the journal to hunt continually within the bearing seeking a central position. This sometimes has been referred to in the art as a lack of stability in the journal. Gas bearing technology is extremely complicated, due to the fact that there is involved compressible flow, and both friction and inertia forces in three-dimension passages, whose geometry (film thickness) varies with load. Whatever the particular analysis utilized to explain the tendency of the journal to hunt, it is well recognized that such a phenomenon does occur. With the invention, and by providing the ring assemblies of elastomeric material described, this wandering or hunting tendency of the journals is substantially reduced. Considering a particular bearing assembly, on its rotor journal moving toward an eccentric position relative to the surrounding stator bearing, an increase in the pressure of gas forming the bearing in the region where displacement has occurred takes place. On the opposite side of the journal an increase in the thickness of the capillary spaces occurs with a decrease in the pressure of gas resulting. Because of the then high pressure condition existing on one side and the low pressure condition existing on the other, a force results tending to urge the rotor journal back toward the low pressure side in an attempt to reach equilibrium. With the surrounding elastomeric ring assembly, and on such an eccentricity occurring, the amount that the thickness of the capillary space decreases is reduced and the amount that the thickness of the space on the opposite side of the bearing increases is reduced. Ridges 50a compress slightly to enable the stator bearing, in a manner of speaking, to move ahead of the rotor journal. On the journal meeting increased resistance, it is finally forced in the opposite direction, and when this occurs the stator bearing through inertia is still moving in the initial direction which anticipates journal movement. Automatically, an effect is produced which minimizes the eccentricity ultimately reached by the rotor journal.

Figure 2:
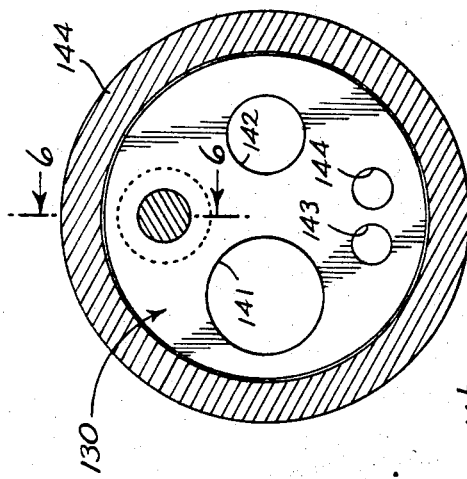
FIG. 2 (second page of drawings) is a cross-sectional view, taken along the line 2—2 in FIG. 1, showing details of how a powerhead assembly in the handpiece is supported on a handle portion.

To further promote quiet operation, and to inhibit any resonating conditions from being set up in the powerhead assembly, the powerhead assembly is mounted on handle portion 10 through a yieldable mounting construction which functions to dampen movements in the powerhead assembly. Specifically, and referring to FIGS. 1 and 2, interposed between boss 70 and handle mount insert 122 is a gasket element 130. Such comprises a rigid disc center 132 covered on opposite faces and around its perimeter by elastomeric layers, such as those shown at 134, 136, 138. The gasket element includes bores, such as those shown at 141, 142, 143, and 144 aligned with each of the passages in boss 70, to enable fluid flow through the gasket. Layers 134, 136 of the gasket form a tight seal with the end faces of boss 70 and handle mount insert 122. The gasket element constitutes a dampening element compressed between the powerhead assembly or portion and the handle portion when such portions are drawn together.

Securing the powerhead assembly to the handle portion is an adjustable element or mounting nut 144 with internal threads 144a and screwed onto external threads 70a on boss 70. An internal flange 144b of the mounting nut bears against an O ring 146 which has its opposite side resting on a ledge 122a of the handle mount insert. The O ring constitutes a yieldable cushion in the mounting of nut 144 on the handle portion. It should be apparent that on turning of the nut whereby it is advanced axially onto boss 70, such serves to bring flange 144b toward ledge 122a so as to compress the O ring and draw the handle portion toward the powerhead assembly or portion. In this way the powerhead assembly and handle portion are mounted together with a dampening action provided between the parts. An annular elastomer filler is shown at 145.

Referring to FIG. 6, the powerhead assembly is prevented from twisting relative to the handle portion by dowel pin 150 which extends between boss 70 and insert 122. Boss 70 has a counterbore 154 therein of somewhat larger size than the dowel pin, and layer 136 of the gaskets includes an integral sleeve portion 136a which surrounds the dowel pin where it extends into counterbore 154. Thus, a cushion mount is provided for the end of the dowel pin, preventing the transmission of vibrations from the boss to the handle portion through the pin.

It should be obvious from the above that the dental handpiece of the invention, and the pneumatic motor which forms part of the handpiece, have a number of advantages over constructions known to date. Included in these advantages is the feature wherein the gas bearing assemblies are self-adjusting, with gas pressures within the pneumatic motor functioning properly to position the stator bearings relative to the rotor journals which they surround. The stator bearings are mounted within the bore or tunnel receiving them by novel ring assemblies functioning to mount the rotor in a manner inhibiting the eccentric movements that characterize an air bearing assembly. The ring assemblies at the same time permit axial shifting of the stator bearings in the manner required to produce self-adjustment. The spindle, turbine wheel and gas bearing assemblies are removable as a unit assembly from the housing section of the motor, by removal of cover portion or cap 68b. Thus, entire replacement of the unit assembly is readily performed. The power-driven turbine wheel is constructed so that through windage the proper air pressure is produced in spaces 92, 93 to produce bearing adjustment. With end wall 68a an integral part of the housing section for the motor, the manifold described permitting the discharge of air or water onto the area being worked upon, from points distributed about the burr axis, is made possible. The entire head assembly is supported on the handle of the handpiece through a cushion mounting inhibiting the build-up of vibrations in the powerhead assembly. The unit, with relatively simple tools, can be easily disassembled when repair or replacement of parts is necessary.

While an embodiment of the invention has been described, it is obvious that variations and modifications are possible without departing from the invention. It is desired to cover all such forms of the invention as would be apparent to one skilled in the art, and that come within the scope of the appended claims.

It is claimed and desired to secure by Letters Patent:

1. In a motor, a gas bearing assembly comprising a bearing part and a coaxial journal part mounted for rotation relative to the bearing part; said bearing part having a frustoconical gas-bearing defining surface and said journal part having a frusto-conical gas-bearing defining surface cooperating with said first-mentioned surface to define an annular capillary space between the parts of tapered outline for containing gas under pressure distributed as a supporting film; a gas supply passage for containing a supply of gas under pressure; connecting passage means connecting said gas supply passage and said capillary space for directing gas under pressure from said supply passage into said capillary space, the pressure of gas in said capillary space tending to thrust the bearing and journal parts axially apart by reason of the tapered outline of the capillary space; a slide mounting for one of said parts accommodating sliding movement of the part axially as urged by such gas under pressure in the capillary space; an end face on said one part which is moved forward by such axial movement of the part; and a chamber bounded by said end face of said one part supplied gas from said gas supply passage at a pressure sufficient to urge by acting on said end face sliding movement of said one part axially toward the other part to maintain a proper clearance between the gas-bearing defining surfaces whereby said gas bearing assembly is self-adjusting.

2. The motor of claim 1, wherein said one part is the bearing part which is nonrotating and surrounds the journal part, and the slide mounting comprises a member with an internal wall defining a tunnel therein which receives the nonrotating bearing part, said tunnel having a portion which is uniformly cross-sectioned extending in an axial direction, said portion of said tunnel snugly receiving the bearing part while accommodating its sliding movement.

3. The motor of claim 2, wherein said bearing part includes a ring assembly extending thereabout and said ring assembly comprises an annular member of elastomeric material including an annular web and axially-spaced circumferential ridges on the outside sealed to the wall defining said portion of the tunnel, a manifold space is defined between said ridges on the outside of the annular member, and said annular web on its inside is recessed by annular grooves disposed adjacent but radially inwardly of said ridges.

4. The motor of claim 2, wherein the bearing part includes an annular member of elastomeric material extending thereabout which slides on the internal wall defining said tunnel, said annular member comprises an annular web and axially spaced circumferential ridges joined to said web sealed to the wall which defines said tunnel, a manifold space being defined between said ridges, and said connecting passage means comprises a first course connecting said gas supply passage and said manifold space, and a second course in the bearing part connecting said manifold space and said capillary space.

5. In a pneumatic motor, a spindle, a pair of axially-spaced and aligned journals mounted on said spindle, each having outer frusto-conical gas-bearing defining surfaces, said journals being disposed with the smaller diameter ends of said frusto-conical surfaces facing each other, a stator bearing surrounding one of said journals and another stator bearing surrounding the other of said journals, said stator bearings having internal frusto-conical gas-bearing defining surfaces cooperating with said surfaces of said journals to define capillary spaces of tapered outline for containing gas under pressure distributed as a supporting film, each journal and its associated stator bearing comprising a gas bearing assembly in the motor, a gas-driven turbine wheel mounted on the spindle between the gas bearing assemblies, a slide mounting for the stator bearings accommodating their sliding movement axially toward each other as urged by gas under pressure in said capillary spaces, an end face for each stator bearing which is moved forward by such axial movement of the stator bearing, and chamber means bounded by said end faces of the stator bearings for receiving gas after such gas has passed against the turbine wheel to drive the wheel and for storing such gas at a pressure sufficient to urge by acting on said end faces sliding movement of the stator bearings axially outwardly to maintain proper clearance between the gas-bearing defining surfaces in the gas bearing assemblies whereby the gas bearing assemblies are self-adjusting.

6. The pneumatic motor of claim 5, wherein the slide mounting for the stator bearings comprises a housing section with an internal wall defining a tunnel receiving the stator bearings which tunnel is uniformly cross sectioned in an axial direction in a region receiving said stator bearings, said housing section has end cover portions closing off opposite ends of said tunnel, one of said end cover portions being removable to open up one end of said tunnel, and the spindle includes mechanism holding the spindle, the turbine wheel, journals, and stator bearings together as a unit assembly, said unit assembly being removable from said tunnel on removal of said one cover portion through the opening at said one end produced by removal of said one cover portion.

7. The motor of claim 5, wherein said slide mounting for the stator bearing comprises a housing section with an internal wall defining a tunnel receiving the stator bearings, said housing section has an end cover portion closing off an end of the tunnel, a fluid manifold is joined to said end cover portion with walls defining an internal collecting channel, a discharge passage in said manifold connects said channel with the atmosphere, and a feed passage in the housing section connects with said channel and provides for the supply of fluid to said channel.

8. The motor of claim 6, wherein said mechanism holding the spindle, turbine wheel, journals and stator bearings together as a unit assembly comprises means on the ends of the spindle that prevents the separation of the journals from the spindle by movement of the journals axially outwardly off the ends of the spindle, and the turbine wheel projects radially outwardly between the stator bearings to limit axial inward movement of the stator bearings.

9. The motor of claim 8, wherein each stator bearing includes a ring assembly comprising an annular web of elastomeric material and integral axially-spaced circumferential ridges on the outside of said web sealed to and slidable on the wall defining the tunnel, a manifold space is defined between said ridges on the outside of the web, passage means in said housing section directs gas into said manifold space, and passage means in said stator bearing connects said capillary space and said mnifold space.

10. The motor of claim 7, wherein multiple discharge passages are provided in said manifold connecting with said channel, and such discharge passages are distributed about the axis of the spindle.

References Cited

UNITED STATES PATENTS

| | | | |
|---|---|---|---|
| 3,074,167 | 1/1963 | Turchi et al. | 32—27 |
| 3,088,707 | 5/1963 | Williams et al. | 253—2 |
| 3,268,205 | 8/1966 | Allen et al. | 253—2 |

EVERETTE A. POWELL, JR., *Primary Examiner.*